US006947563B2

(12) United States Patent
Fagin et al.

(10) Patent No.: US 6,947,563 B2
(45) Date of Patent: Sep. 20, 2005

(54) METHOD FOR ASSIGNING ENCRYPTION KEYS

(75) Inventors: Ronald Fagin, Los Gatos, CA (US); Jeffrey Bruce Lotspiech, San Jose, CA (US); Nimrod Megiddo, Palo Alto, CA (US); Dalit Naor, Palo Alto, CA (US); Simeon Naor, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 09/789,451

(22) Filed: Feb. 20, 2001

(65) Prior Publication Data

US 2002/0114471 A1 Aug. 22, 2002

Related U.S. Application Data

(63) Continuation-in-part of application No. 09/379,049, filed on Aug. 23, 1999, now Pat. No. 6,609,116, which is a continuation-in-part of application No. 09/065,938, filed on Apr. 24, 1998, now Pat. No. 6,118,873.

(51) Int. Cl.[7] .............................. H04L 9/00; H04N 7/167
(52) U.S. Cl. ........................ 380/278; 380/210; 705/57; 725/31
(58) Field of Search ................................ 380/277, 278, 380/286, 44–47, 201, 210; 713/200, 201; 705/51, 57; 725/25, 31

(56) References Cited

U.S. PATENT DOCUMENTS

| 4,075,435 A | 2/1978 | Eppler, Jr. ............... 179/100.1 |
| 4,207,440 A | 6/1980 | Schiffman ................ 179/100.1 |
| 4,423,287 A | * 12/1983 | Zeidler ......................... 705/71 |
| 4,605,820 A | * 8/1986 | Campbell, Jr. ............... 705/71 |
| 4,694,491 A | 9/1987 | Horne et al. .................. 380/20 |
| 5,345,505 A | 9/1994 | Pires ........................... 380/20 |
| 5,538,773 A | 7/1996 | Kondo ...................... 428/64.1 |
| 5,574,785 A | * 11/1996 | Ueno et al. ..................... 380/2 |
| 5,592,552 A | 1/1997 | Fiat ............................. 380/21 |
| 5,881,287 A | 3/1999 | Mast ........................... 395/701 |
| 5,917,910 A | 6/1999 | Ishiguro et al. ................ 380/4 |
| 6,373,948 B1 | * 4/2002 | Wool .......................... 380/241 |
| 2002/0106087 A1 | * 8/2002 | Lotspiech et al. .......... 380/278 |
| 2003/0223579 A1 | * 12/2003 | Kanter et al. ................. 380/28 |

FOREIGN PATENT DOCUMENTS

WO    WO 9716896 A1 *  5/1997  ............ H04K/1/00

OTHER PUBLICATIONS

Menezes, Alfred, et al. Handbook of Applied Cryptography. CRC Press LLC, 1997, pp. 576–577.*
PUBLICATION: "Time–Domain Algorithms for Harmonic Bandwidth Reduction and Time Scaling of Speech Signals". David Malah. Submitted to IEEE. pp. 121–133. 1979.
PUBLICATION: "An Overlap–Add Technique Based on Waveform Similarity (WSOLA) For High Quality Time–Scale Modification Of Speech". Proceedings of Eurospeech '93. Berlin, Sep. 21–23, 1993.

* cited by examiner

*Primary Examiner*—Andrew Caldwell
*Assistant Examiner*—Zachary A. Davis
(74) *Attorney, Agent, or Firm*—John L. Rogitz

(57) ABSTRACT

An encryption key matrix has rows grouped into segments, with a set of one segment per column establishing a slot. Slots are assigned to device manufacturers, with the keys of the slots then being assigned to decryption devices made by the respective manufacturer. In generating the slots, the number "q" of segments in a column is first defined such that a predetermined maximum number of devices can be revoked devices (in that all the keys held by the device are revoked) while ensuring that a good device remains a functional device with a probability of at least (1–Q), wherein Q is a predefined device confidence. Once the number "q" of segments has been defined, the slots themselves are defined in a provably non-discriminatory fashion using an error-correcting code such as a Reed-Solomon code. With this invention, overlap between slots can be minimized to minimize the possibility that the key set of an innocent device might be inadvertently revoked when the keys in the slots of a "bad" manufacturer are revoked.

32 Claims, 2 Drawing Sheets

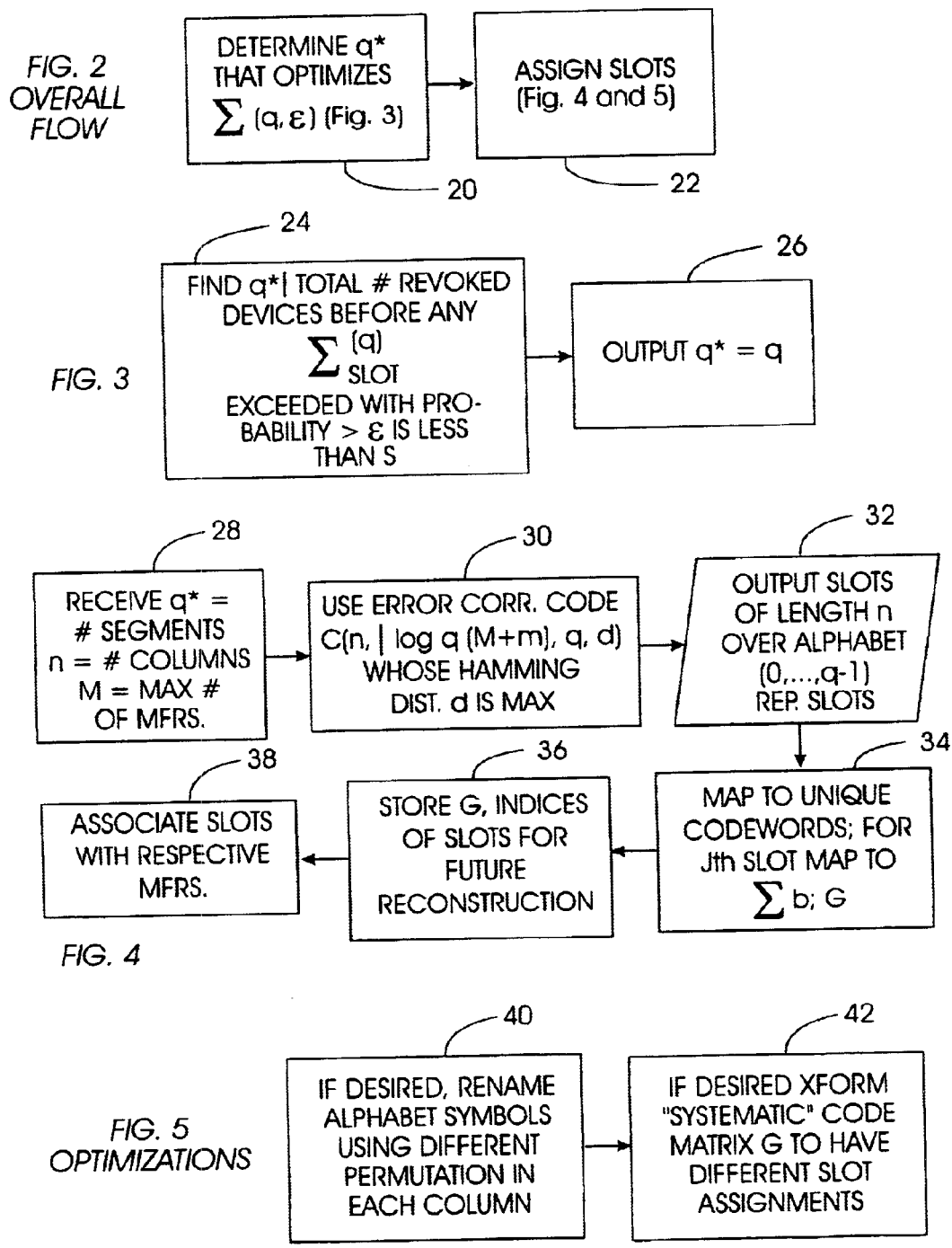

METHOD FOR ASSIGNING ENCRYPTION KEYS

PRIORITY CLAIM

This application is a continuation-in-part of U.S. patent application Ser. No. 09/379,049, filed Aug. 23, 1999, now U.S. Pat. No. 6,609,116, which is a continuation-in-part of U.S. patent application Ser. No. 09/065,938, filed Apr. 24, 1998, now U.S. Pat. No. 6,118,873. Priority is claimed from both of the above documents, both of which are incorporated herein by reference.

BACKGROUND OF THE INVENTION

1. Field of the Invention

The present invention relates generally to broadcast data encryption that uses encryption keys.

2. Description of the Related Art

The above-referenced applications disclose a system for encrypting publicly sold music, videos, and other content. As set forth therein, only authorized player-recorders can play and/or copy the content and only in accordance with rules established by the vendor of the content. In this way, pirated copies of content, which currently cost content providers billions of dollars each year, can be prevented.

In the encryption method disclosed in the above-referenced patent, authorized player-recorders are issued software-implemented device keys from a matrix of device keys. Specifically, the matrix of device keys includes plural rows and columns of keys, and each authorized player-recorder is issued a single key from each column. Each column might contain many thousands of rows. The keys can be issued simultaneously with each other or over time, but in any event, no player-recorder is supposed to have more than one device key per column of the matrix. Although two devices might share the same key from the same column, the chances that any two devices share exactly the same set keys from all the columns of the matrix are very small when keys are randomly assigned.

Using any one of its device keys, an authorized player-recorder can decrypt a media key that in turn can be used to decrypt content that is contained on, e.g., a disk and that has been encrypted using the media key. Because the player-recorder is an authorized device that is programmed to follow content protection rules, it then plays/copies the content in accordance with predefined rules that protect copyright owners' rights in digitized, publicly sold content.

In the event that a device (and its keys) becomes compromised, deliberately or by mistake, it is necessary to revoke the keys of that device. The above-referenced documents describe how to do this. Revoking a set of keys effectively renders the compromised device (and any clones thereof) inoperable to play content that is produced after the revocation. Of course, since more than one device can share any particular key with the compromised device, revoking a set of device keys will result in revoking some keys held by innocent devices. When a small number of revocations occur this is not a problem, however, since only one key in a set is required for decryption, and it will be recalled that the chances that an innocent device shares an entire set of keys with any other device is very small. Accordingly, it is unlikely that revoking the set of keys of a compromised device will result in rendering an innocent device unable to decrypt content.

One way to assign device keys is, for each device, to simply pick a key at random from every column. The present invention recognizes that this approach might not afford as much security as might be hoped if device keys are assigned to "bad" device manufacturers. More specifically, a "bad" manufacturer might be one who deliberately divulges the keys that have been assigned to its devices or through malfeasance permits such divulgation or discovery. In any case, if a single manufacturer compromises a large number of device keys, it will readily be appreciated that a large number of revocations must occur, increasing the likelihood of crippling an innocent device, which might eventually break the entire system.

The present invention further understands that to address the above concerns, each manufacturer can be given keys from only a fraction of the key matrix. While technically sound, the above approach can be made to appear that some manufacturers might be receiving "better" keys than others. The present invention makes the critical observation that key assignments should be made in a way that provably is benign, in that it does not assume a priori that any manufacturer is "bad" or that the assignment scheme otherwise discriminates against a manufacturer for any reason, including size. Moreover, the present invention understands that a key assignment method should be able to account for a predefined total number of revoked devices that an encryption system can tolerate over the lifetime of the system. as well as being capable of being "tuned" in the event that some input parameters of the assignment method require changing over the lifetime of the system. The present invention has made the critical observations noted above and has provided the below solutions to one or more of the observations.

SUMMARY OF THE INVENTION

The invention includes a computer system for undertaking the inventive logic set forth herein. The invention can also be embodied in a computer program product that stores the present logic and that can be accessed by a processor to execute the logic. Also, the invention is a computer-implemented method that follows the logic disclosed below.

A method is disclosed for assigning encryption keys from a key matrix in an encryption system to plural encryption device manufacturers. The method includes determining a number "q" of row segments. Each row segment includes a number of rows in the matrix. The method also includes generating plural slots. A slot is defined to be an assignment of row segments, one row segment for each column. Device keys are assigned to manufacturers by periodically assigning a respective slot to a respective manufacturer. In a preferred embodiment, slots are assigned to manufacturers on an as-needed basis.

Preferably, the number "q" is determined such that a survivability of the system is maximized. In one manifestation, the number "q" is determined such that a predetermined maximum number of devices can have all their keys revoked while ensuring that a good device remains a functional device (i.e., has at least one non-revoked key) with a probability of at least (1−Q), wherein Q is a predefined device confidence. One type of revoked device can be a device made by a manufacturer which has had all its keys revoked, whereas another type of revoked device can simply be an example of a sporadically revoked device.

Once the number "q" is determined, the method includes receiving at least one parameter representing a characteristic of the key matrix, and then using the parameter and an error-correcting code to define the slots. The error-correcting code can be a linear code such as a Reed-Solomon code. In a particularly preferred embodiment, an error-correcting code is used that has a Hamming distance "d" that minimizes overlap between slots using a total number of slots derived from a predefined number "M" of manufacturers.

In another aspect, a computer program device includes a computer program storage device that in turn includes a program of instructions which can be used by a computer. The instructions include logic means for defining, based on at least one error-correcting code, plural slots that are useful by respective devices for decrypting encrypted content.

In yet another aspect, a computer is programmed with instructions to cause the computer to execute method acts. These acts include defining at least two slots from an encryption key matrix having plural columns and plural rows with two or more rows establishing a row segment and with a group of row segments establishing a slot. The computer assigns the slots to respective manufacturers such that an assignation of encryption keys is provably non-discriminatory.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is a flow chart of the overall logic;

FIG. 3 is a flow chart of the logic for determining the number of segments "q";

FIG. 4 is a flow chart of the logic for assigning slots; and

FIG. 5 is a flow chart of slot assignment enhancements.

DETAILED DESCRIPTION OF THE PREFERRED EMBODIMENTS

Figure 1:
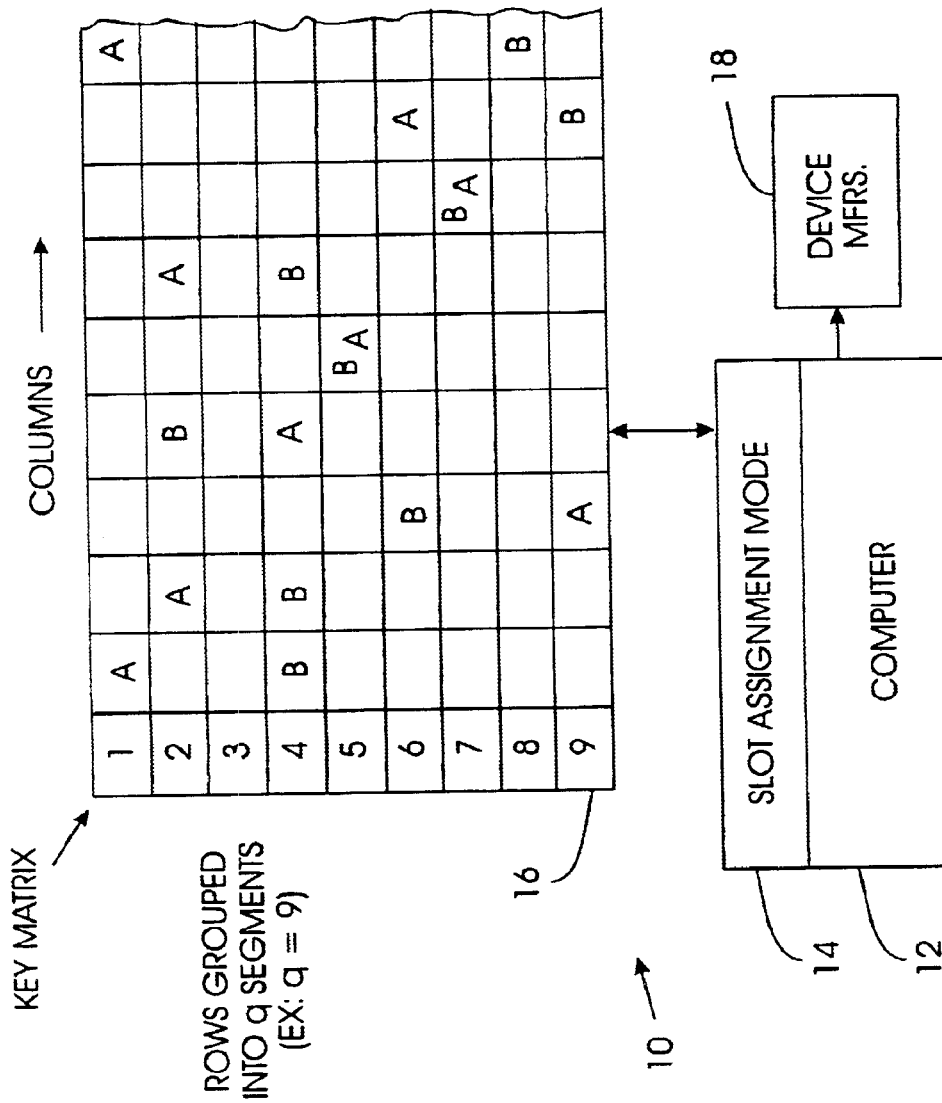
FIG. 1 is a block diagram of the present system using slots.

Referring initially to FIG. 1, a system is shown, generally designated 10, for generating sets of keys in a broadcast content guard system, such as but not limited to the system disclosed in the above-referenced patent. It will be appreciated after the disclosure below that with the present invention, overlap between slots (groups of key sets, defined further below) can be minimized to minimize the possibility that the key set of an innocent device might be inadvertently revoked when the keys in the slots of a "bad" manufacturer are revoked.

As shown, the system 10 includes a key set definition computer 12 that accesses a key set definition module 14 that functions in accordance with disclosure below to define slots, essentially sets of keys chosen from a key matrix 16. As shown, the key matrix 16 has "n" columns, "N" rows, and "q" row segments (q=9 in the non-limiting example shown). Each row segment includes plural rows of the matrix. The rows of a segment can be adjacent to each other or spaced apart throughout the respective column. In any case, each square of the matrix of FIG. 1 represents a single group of many rows in a column, with each row/column index (not shown) representing a respective encryption key.

The number of columns generally is relatively small, e.g., sixteen or thirty two, and the number of rows "N" is relatively large, e.g., perhaps many thousands. As shown in the exemplary illustration of FIG. 1, each slot defined by the computer 12 includes one and only one segment per column. To further illustrate, FIG. 1 shows two slots, labelled "A" and "B", with the following segments listed in column order from left to right: slot "A"=(1, 2, 9, 4, 5, 2, 7, 6, 1) and slot "B"=(4, 4, 6, 2, 5, 4, 7, 9, 8), with the slots A, B overlapping in fifth and seventh columns. Slots are assigned to respective device manufacturers 18. A manufacturer can be assigned more than one slot as needed based on the manufacturer's device production.

It is to be understood that the processor associated with the module 14 accesses the modules to undertake the logic shown and discussed below, which may be executed by a processor as a series of computer-executable instructions.

The instructions may be contained on a data storage device with a computer readable medium, such as a computer diskette having a computer usable medium with computer readable code elements stored thereon. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ compatible code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly the invention is practiced in its essential embodiment by a machine component that renders the program code elements in a form that instructs a digital processing apparatus (that is, a computer) to perform a sequence of function acts corresponding to those shown.

With the above in mind, attention is now drawn to FIG. 2, which shows the overall logic of the present invention. First, an optimal number "q*" of segments is defined at block 20 and as more fully disclosed below in reference to FIG. 3. It is to be understood that once the number of segments is defined, each segment is assigned the floor of N/q rows, wherein N is the total number of rows in the matrix 16. Then, once the number of segments is defined the logic moves to block 22 to define slots and assign the slots on an as-needed basis to the manufacturers 18, which in turn derive key sets from each slot to assign to their respective devices. The key sets of a slot alternatively can be defined by the computer 12 in accordance with co-pending U.S. patent application Ser. No. 09/777,056. A player-recorder device can access its key set to decrypt the content on media, again in accordance with the above-referenced patent. As used herein "media" can include but is not limited to DVDs, CDs, hard disk drives, and flash memory devices.

Now referring to FIG. 3, the logic of determining an optimum number q* of segments, used as "q" in the logic of FIGS. 4 and 5, can be seen. Essentially, the number q* is determined such that a survivability of the system 10 is maximized. In one preferred embodiment, q* is determined such that a predetermined maximum number of devices can have all their keys revoked while ensuring that a good device remains functional (i.e., has at least one non-revoked key) with a probability of at least (1−Q), wherein Q is a predefined device confidence. Accordingly, as input, block 24 of FIG. 3 receives the device confidence Q, certain matrix parameters (e.g., size), the total number M of manufacturers an estimate K of the number of "bad" manufacturers that the system is to tolerate, and the total number "T" of devices. Also, a design parameter $\epsilon$ (e.g., $\epsilon$=0.001) is received.

Block 24 represents the determination of the optimal q* as follows, in accordance with the principles above. To understand the presently preferred non-limiting way to determine q*, the below equations are set forth:

let f(q)=fraction of matrix lost due to K "bad" manufacturers;

let $\Sigma_n$(q)=survivability of an Nxn assignment scheme given that each of K bad manufacturers consume 1/q of each column in the matrix;

let $\Sigma_{slot}$(q)=survivability of a slot given that there are K bad manufacturers;

let $\Sigma$(q, $\epsilon$)=overall survivability of the system, representing the strength of the design.

Then, $f(q)=1-(1-1/q)^K$ $\Sigma_N(q)=\ln(1-Q^{1/n})/\ln(1-(1/f(q)^N))$ $\Sigma_{slot}(q)=\ln(1-Q^{1/f(q)*n})/\ln(1-q/N)$ $\Sigma_N(q)/\Sigma_{slot}(q)$=number of fully activated slots $\Sigma(q, \epsilon)$=is interpreted as follows: the entire system survives as long as, with probability of (1-$\epsilon$), every slot does not exceed its survivability threshold $\Sigma_{slot}$(q). Since there are $\Sigma_N(q)/\Sigma_{slot}(q)$ slots, and each can hold up to $\Sigma_{slot}$(q)-1 revoked devices, $\Sigma$(q, $\epsilon$) is the total number of revoked devices the system can tolerate before any one of the slots exceeds $\Sigma_{slot}$(q) with a probability >$\epsilon$.

Those skilled in the art will recognize that f(q), $\Sigma_N$(q), and $\Sigma_{slot}$(q) are straightforward calculations that are derivable from probability textbooks.

Once the optimum number q* of segments is found. the logic moves to block 26 to output q*=q for use below in FIGS. 4 and 5.

The logic of the present invention in defining and assigning slots once the optimal value for "q*" is determined can be seen in reference to FIGS. 4 and 5. Commencing at block 28 in FIG. 4, parameters of the key matrix 16 are received. In the presently intended embodiment, these parameters include the number "n" of columns and the optimal number "q*" of row segments found at block 26. Also, the total number "T" of devices to be generated is received.

At block 28 an actual code C (n,k,q,d) which has a "q" as close as q* as possible for use in block 30 below is found. The code C (n,k,q,d) is selected such that "q" is as close to q* as possible, k=$\log_q$(M+m), wherein M is the total number of manufacturers, m is equal to $\Sigma_N(q)/\Sigma_{slot}(q)$, and such that there exists an error correcting code for this q, k, n, with a Hamming distance d that is sufficiently large to resist K evil manufacturers, namely, n-K(n-d)>0.

Moving to block 30, a non-random function is used to define slots. In a preferred embodiment, the function is an error-correcting code, such as but not limited to a greedily-constructed linear code. By "error-correcting code" is meant a non-random function that generates plural slots with a prescribed Hamming distance between every two slots. In a particularly preferred embodiment, when q$\geq$n+1 the optimum linear code is a Reed-Solomon code. Essentially, the code is a template that generates slots by constructing vectors that achieve the minimum possible overlap between vectors, with each vector representing a respective slot. More specifically, the best code C as a function of {n, k, q, d}, wherein k=$\log_q$(M+m), wherein M is the total number of manufacturers, m is defined as above, and further wherein d is the largest Hamming distance, is used.

When a Reed-Solomon code is used, the code uses the above principles, receiving as input at block 30 the numbers {1, . . . , [M+m]}. The code generates q-ary representations of the numbers {1, . . . , [M+m]}, which is output to block 32. Each q-ary representation can be regarded as a vector of length "n" (the number of segments in a slot) over the alphabet of (0, . . . , q-1) (the number of segments).

The present invention recognizes that a linear code has an associated generating matrix G that has k rows, and this generating matrix G can be used to map vectors to codewords in a straightforward way for efficient data storage purposes. Accordingly, in one preferred embodiment the logic next moves to block 34, wherein each vector is mapped to a unique codeword, preferably on the fly. More particularly, for the integer "j" of the $j^{th}$ vector (i.e., the $j^{th}$ slot) having a q-ary (i.e., base q) representation $(b_1, \ldots, b_k)$, the $j^{th}$ vector is mapped to the codeword generated by taking the product of the generating matrix G and the vector $(b_1, \ldots, b_k)$. These codewords are output at state 36, with each representing a slot. It is to be appreciated that each vector represents a set of segment indices in the key matrix 16, with each index being associated with a respective segment. All that needs to be stored at block 36 to support future lookup/add/delete operations is the generating matrix G and the index (codeword) of the last-defined slot (i.e., the last-defined vector), because, since the error-correcting code is deterministic, all previously generated vectors can be regenerated on an as-needed basis from these two inputs. In other words, slots other than the last-defined slot can be regenerated using the generating matrix G and the index of the last-defined slot.

Once slots have been generated, the logic proceeds to block 38. At block 38, vectors are associated with respective player-recorder device manufacturers, preferably on the fly, not a priori. The keys are then provided to the respective player-recorders. That is, to avoid a bias in favor of large manufacturers, the value "t" at which a manufacturer receives a new slot is set to T/[$\Sigma_N(q)/\Sigma_{slot}(q)$].

It is to be understood that some elective optimizations to the above logic can be implemented if desired. For instance, prior to block 34 the $j^{th}$ index can be pseudorandomly permutated. Specifically, if f(j) is any random permutation of the numbers (1, . . . , [M+m]), then the $j^{th}$ slot (i.e., the $j^{th}$ vector) is assigned to a codeword that is the product of the generating matrix G and the q-ary representation of f(j), instead of j, at block 34. For purposes of the present claims, however, both mappings are covered unless explicitly differentiated. One way to establish f(j) is to select a [M+m]'$\leq$ [M+m] such that (0, . . . , [M+m]') forms a finite field, and then find a generator "g" of this field and define f(t)=$g^t$.

Further, as indicated at block 40 of FIG. 5, the codeword alphabet symbols (0, . . . , q-1) can be renamed based on a random permutation. If desired, a different renaming permutation can be used for every column or group of columns, to make any overlap between groups of columns less obvious to potential hackers.

Also, if desired, at block 42 any systematic representation of the generating matrix G can be transformed using row operations to produce a matrix or matrices that are equivalent, but that have the property that sequential segment assignments have entirely different indices in each column. In other words, at block 42 the generating matrix G can be transformed to have a non-systematic segment assignment, such that information about the error-correcting code that the use of a systematic matrix G might otherwise reveal to a hacker is concealed.

While the particular METHOD FOR ASSIGNING ENCRYPTION KEYS as herein shown and described in detail is fully capable of attaining the above-described objects of the invention. it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one", not "only one", unless otherwise stated in the claim. All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A method for assigning keys from a key matrix in an encryption system to plural encryption device manufacturers, comprising:

determining a number "q" of row segments, each row segment including plural rows in the matrix;

generating plural slots, each slot including a row segment from each column; and assigning device keys to manufacturers by periodically assigning a respective slot to a respective manufacturer.

2. The method of claim 1, wherein slots are assigned to manufacturers on an as-needed basis.

3. The method of claim 1, wherein the determining act includes determining the number "q" such that a survivability of the system is maximized.

4. The method of claim 3, wherein device keys can be revoked, wherein a device having all keys revoked establishes a revoked device, and wherein the determining act includes determining the number "q" such that a predetermined maximum number of devices can be revoked devices while ensuring that a good device remains a functional device with a probability of at least (1−Q), wherein Q is a predefined device confidence.

5. The method of claim 1, wherein the act of generating plural slots includes:

receiving at least one parameter representing a characteristic of the key matrix; and using the parameter and an error-correcting code, defining plural slots.

6. The method of claim 5, wherein the error-correcting code is a Reed-Solomon code.

7. The method of claim 5, wherein the receiving act includes receiving at least the number "q" and a column parameter "n" representing the number of columns in the key matrix, and the method further includes:

using an error-correcting code having a Hamming distance "d" that minimizes overlap between slots.

8. The method of claim 7, comprising finding a code C (n,k,q,d) such that "q" is close to an optimum number q* of rows as possible, k=log$_q$(M+m), wherein M is a total number of manufacturers, m is equal to a number of fully activated slots, and such that there exists an error correcting code for q, k, n, with a Hamming distance d that satisfies n−K(n−d) >0, wherein "K" represent evil manufacturers.

9. The method of claim 8, wherein the error-correcting code defines the slots using a total number of slots derived from a predefined number "M" of manufacturers.

10. The method of claim 5, wherein the error-correcting code is associated with a compact generating function and the method further comprises storing the compact generating function and an index of a stored slot, whereby no slots other than the index of the stored slot need be stored in that slots can be regenerated using the compact generating function and the index of the stored slot.

11. The method of claim 10, wherein the compact generating function is a generating matrix G, and the method further comprises transforming the compact generating function G to have a non-systematic segment assignment.

12. The method of claim 5, wherein the error-correcting code generates vectors over an alphabet having symbols, and the method further comprises renaming at least one symbol based on a pseudorandom permutation.

13. A computer program device, comprising:

a computer program storage device including a program of instructions usable by a computer, comprising:

logic means for defining, based on at least one error-correcting code, plural slots useful by respective devices for decrypting encrypted content; and logic means for associating plural slots with respective device manufactures.

14. The device of claim 13, wherein each slot represents a set of device keys in a key matrix.

15. The device of claim 14, wherein device keys can be revoked, wherein a device having all keys revoked establishes a revoked device, and wherein the device includes means for determining a number "q" representing a number of row segments in the key matrix such that a predetermined maximum number of devices can be revoked devices awhile ensuring that a good device remains a functional device with a probability of at least (1−Q), wherein Q is a predefined device confidence.

16. The device of claim 13, wherein the error-correcting code is a Reed-Solomon code.

17. The device of claim 13, wherein the means for defining includes:

logic means for receiving at least a number "q" representing a number of row segments in a key matrix and a column parameter "n" representing the number of columns in the key matrix; and logic means for using the error-correcting code having a Hamming distance "d" that minimizes overlap between slots.

18. The device of claim 17, wherein the error-correcting code defines the slots using a total number of slots derived from a predefined number "M" of manufacturers.

19. A computer programmed with instructions to cause the computer to execute method acts including:

from an encryption key matrix having plural columns and plural rows, two or more rows establishing a row segment, a group of row segments establishing a slot, defining at least two slots to be assigned to respective manufacturers such that an assignation of encryption keys is non-discriminatory.

20. The computer of claim 19, wherein the defining act undertaken by the computer further includes determining a number "q" of row segments, and the method acts undertaken by the computer further include assigning keys to manufacturers by periodically assigning a respective slot to a respective manufacturer.

21. The computer of claim 20, wherein slots are assigned to manufacturers on an as-needed basis.

22. The computer of claim 20, wherein the determining act undertaken by the computer includes determining the number "q" such that a survivability of the system is maximized.

23. The computer of claim 22, wherein device keys can be revoked, wherein a device having all keys revoked establishes a revoked device, and wherein the determining act undertaken by the computer includes determining the number "q" such that a predetermined maximum number of devices can be revoked devices while ensuring that a good device remains a functional device with a probability of at least $(1-Q)$, wherein Q is a predefined statistic.

24. The computer of claim 20, wherein the act of defining at least two slots undertaken by the computer includes:

receiving at least one parameter representing a characteristic of the key matrix; and using the parameter and an error-correcting code, defining plural slots.

25. The computer of claim 24, wherein the computer further undertakes method acts including finding a code C (n,k,q,d) such that "q" is close to an optimum number q* of rows as possible, $k=\log_q(M+m)$, wherein M is a total number of manufacturers, m is equal to a number of fully activated slots, and such that there exists an error correcting code for q, k, n, with a Hamming distance d that satisfies $n-K(n-d) > 0$, wherein "K" represents evil manufacturers.

26. The computer of claim 25, wherein the error-correcting code is a Reed-Solomon code.

27. The computer of claim 24, wherein the error-correcting code is a linear code.

28. The computer of claim 24, wherein the receiving act undertaken by the computer includes receiving at least the number "q" and a column parameter "n" representing the number of columns in the key matrix, and the method acts undertaken by the computer further include:

using an error-correcting code having a Hamming distance "d" that minimizes overlap between slots.

29. The computer of claim 28, wherein the error-correcting code defines the slots using a total number of slots derived from a predefined number "M" of manufacturers.

30. The computer of claim 24, wherein the error-correcting code is associated with a compact generating function and the method acts undertaken by the computer further comprise storing the compact generating function and an index of a stored slot, whereby no slots other than the index of the stored slot need be stored in that slots can be regenerated using the compact generating function and the index of the stored slot.

31. The computer of claim 30, wherein the compact generating function is a generating matrix G, and the method acts undertaken by the computer further comprise transforming the compact generating function G to have a non-systematic segment assignment.

32. The computer of claim 24, wherein the error-correcting code generates vectors over an alphabet having symbols, and the method acts undertaken by the computer further comprise renaming at least one symbol based on a pseudorandom permutation.

* * * * *